Patented Apr. 3, 1951

2,547,147

UNITED STATES PATENT OFFICE 2,547,147

METHOD OF PRODUCING SULFANILYL-THIOUREAS

Bruce Earle Baker, Stanbridge East, Leo Brickman, Montreal, and Leo Edward Ryan, Dorval, Quebec, Canada, assignors to Monsanto Chemical Company, St. Louis, Mo., a corporation of Delaware No Drawing. Application June 24, 1946, Serial No. 678,884. In Canada November 29, 1944

Section 1, Public Law 690, August 8, 1946
Patent expires November 29, 1964

2 Claims. (Cl. 260—397.7)

This invention relates to the production of acetylsulfanilylthiourea and sulfanilylthiourea and is directed to a new and improved method whereby they may be produced more readily and economically.

Sulfanilylthiourea shows promise of being of value in combating bacterial infections while acetylsulfanilylthiourea is a valuable intermediate in the production of sulfathiazole, which, as is well known, is an antibacterial agent of outstanding merit. It is desirable therefore, that a process be developed for producing them on a commercial scale.

According to the present invention, we have found that acetylsulfanilylthiourea and sulfanilylthiourea can be readily obtained by the reaction of the calcium salt of acetylsulfanilylcyanamide with hydrogen sulfide to give acetylsulfanilylthiourea, which is then hydrolyzed to sulfanilylthiourea. The reaction may be represented schematically as follows.

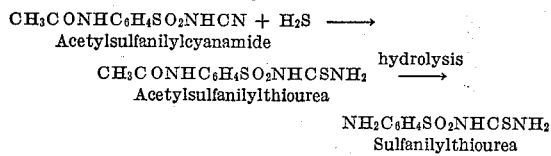

In carrying out the process of the present invention a sulfanilylcyanamide of general formula

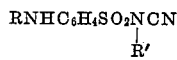

where
R=acyl or H
R'=calcium usually in the form of a salt, is reacted with hydrogen sulfide in aqueous solution in a sealed tube. The temperatures employed range from 70 to 160° C. The water may be replaced in whole or in part by other hydroxylic solvents such as ethanol or methanol. The time of the reaction varies with the pressure and the temperature used. Pressures up to several hundred pounds per square inch are preferred to hasten the reaction. The pH of the reaction medium should be between the limits of 4 to 11, preferably 7–10 where best yields are obtained.

The hydrogen sulfide may be provided by ammonium sulfide, sodium bisulfide or the like salts which dissociate at the temperature of the reaction or it may be generated in situ.

When acetylsulfanilylcyanamide is used acetylsulfanilylthiourea is formed. The acetylsulfanilylthiourea can be readily converted into sulfanilylthiourea by any one of the methods of hydrolysis well known to the art. When sulfanilylcyanamide is reacted with hydrogen sulfide at elevated temperatures and pressures, sulfanilylthiourea is obtained directly.

The following specific examples are illustrative of the preferred method of carrying out the reaction but are not intended to limit the scope of the invention.

EXAMPLE I

Preparation of acetylsulfanilylthiourea

Two hundred and twenty-five grams of calcium acetylsulfanilylcyanamide suspended in 1500 ml. water were placed in a steel autoclave fitted with an agitator, thermometer well, and an inlet tube for hydrogen sulfide gas. The mixture was heated to 100° C. for 16 hours with constant agitation, during which time hydrogen sulfide gas was passed into the mixture so that the pressure was kept constant at 50 pounds. At the end of this period, the pressure was released, 225 grams of sodium chloride was added to the hot solution and the mixture stirred until the salt dissolved. Upon cooling, 190 g. of the sodium salt of acetylsulfanilylthiourea crystallized out and was filtered off. If acetylsulfanilylthiourea itself is desired, the sodium salt is dissolved in water and acidified with dilute acid. The acetylsulfanilylthiourea separates out and is filtered off, washed with water and dried.

EXAMPLE II

Preparation of sulfanilylthiourea by deacetylation

Ten grams of acetylsulfanilylthiourea was refluxed for ten minutes with 40 ml. of 10% sodium hydroxide solution. The solution was now cooled and acidified with hydrochloric acid until the solution turned Congo paper blue. The sulfanilylthiourea precipitated out and was filtered off and washed with water. It weighed 6 g.

It is obvious that the above examples may be varied or modified without departing from the spirit of the invention.

We claim:

1. In a process for the preparation of sulfanilylthioureas and derivatives, the steps comprising heating an aqueous suspension of calcium acetyl sulfanilylcyanamide at a temperature of at least 70° C. with hydrogen sulfide under pressure, and thereafter dissolving sodium chloride into the aqueous reaction mixture and crystallizing out the sodium salt of acetyl sulfanilylthiourea from the aqueous reaction mixture.

2. In a process for the preparation of sulfanilylthioureas an derivatives, the steps comprising heating an aqueous suspension of calcium acetyl sulfanilylcyanamide at temperatures within the range of 70 to 160° C. with hydrogen sulfide under pressure, and thereafter forming and separating the sodium salt of acetyl sulfanilylthiourea by dissolving sodium chloride into the hot aqueous reaction mixture and then cooling the aqueous reaction mixture to crystallize out the sodium salt of acetyl sulfanilylthiourea.

BRUCE EARLE BAKER.
LEO BRICKMAN.
LEO EDWARD RYAN.

REFERENCES CITED

The following references are of record in the file of this patent:

UNITED STATES PATENTS

| Number | Name | Date |
|---|---|---|
| 2,254,136 | Buck et al. | Aug. 26, 1941 |
| 2,336,907 | Winnek | Dec. 14, 1943 |
| 2,380,006 | Winnek et al. | July 10, 1945 |

FOREIGN PATENTS

| Number | Country | Date |
|---|---|---|
| 260,061 | Germany | May 13, 1913 |
| 297,999 | Great Britain | Oct. 4, 1928 |
| 336,111 | Great Britain | Oct. 7, 1930 |

OTHER REFERENCES

Winnek et al.: Jour. Am. Chem. Soc., vol. 64 (1942), p. 1682.